Nov. 3, 1942.　　　G. McD. JOHNS ET AL　　　2,300,674
SECONDARY RACK
Filed July 12, 1941　　　2 Sheets-Sheet 1
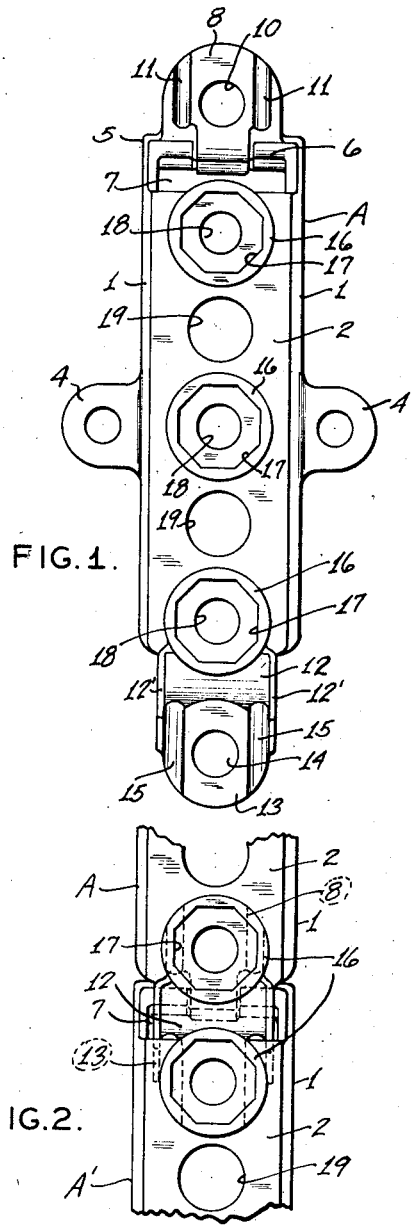
FIG. 1.
FIG. 2.
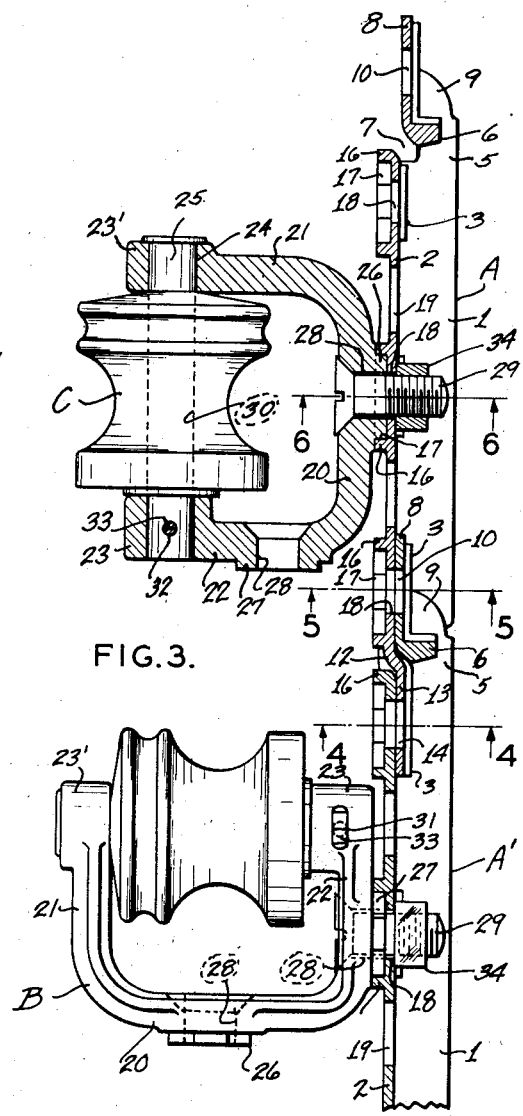
FIG. 3.
INVENTORS
GEORGE McD. JOHNS
THOMAS T. RICHARDS
BY
ATTORNEY Nov. 3, 1942. G. McD. JOHNS ET AL 2,300,674
SECONDARY RACK
Filed July 12, 1941 2 Sheets-Sheet 2

INVENTORS
GEORGE McD. JOHNS
THOMAS T. RICHARDS
BY
ATTORNEY

Patented Nov. 3, 1942

2,300,674

UNITED STATES PATENT OFFICE 2,300,674

SECONDARY RACK

George McD. Johns, Sappington, and Thomas T. Richards, St. Louis, Mo., assignors to Smith-johns, Inc., Sappington, Mo., a corporation of Missouri Application July 12, 1941, Serial No. 402,226

11 Claims. (Cl. 174—161)

This invention relates generally to electric line equipment and, more particularly, to a certain new and useful improvement in structures commonly designated secondary racks for supporting telephone and electric transmission lines and the like.

Our invention has for its primary objects the provision of a rack of the type and for the purposes stated which is simple, durable, and rugged in structure, which may be cheaply and economically manufactured, which may be quickly and conveniently installed, and which comprises support-engaging bases and insulator-supporting brackets uniquely co-operably constructed for rack enlargement or for selective disposition of the brackets for facile meeting practically all pole or line requirements.

And with the above and other objects in view, our invention resides in the novel features of form, construction, arrangement, and combination of parts presently described and pointed out in the claims.

In the accompanying drawings (two sheets)—

Figure 1 is a plan view of a base or attachment-fixture of a so-called secondary rack embodying our invention;

Figure 2 is a fragmentary plan view of a pair of bases in end-to-end connected relation for rack enlargement;

Figure 3 is an enlarged fragmental longitudinal sectional view illustrating a pair of bases assembled as in Figure 2 with two brackets and spools or insulators disposed thereon in right-angular relation one to the other;

Figure 4:
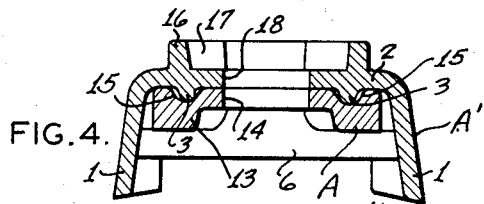
Figure 5:
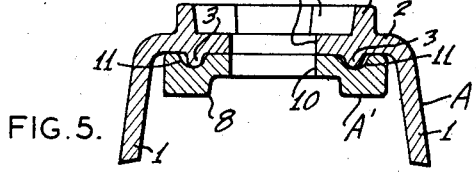
Figure 6:
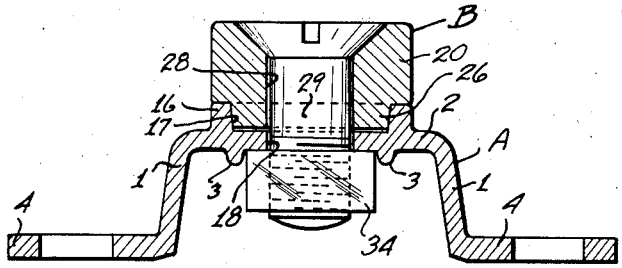
Figure 7:
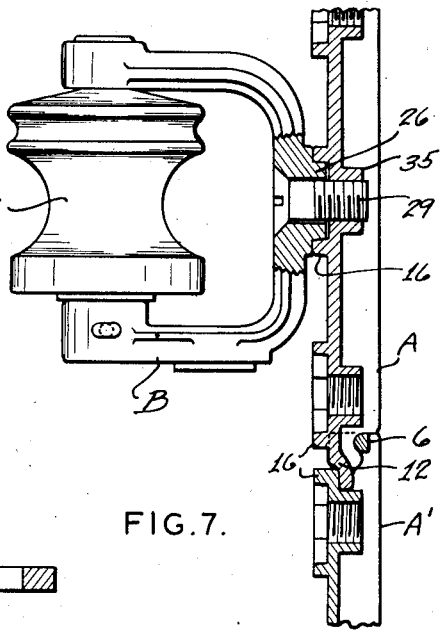
Figures 8, 9, 10, 11, 12:
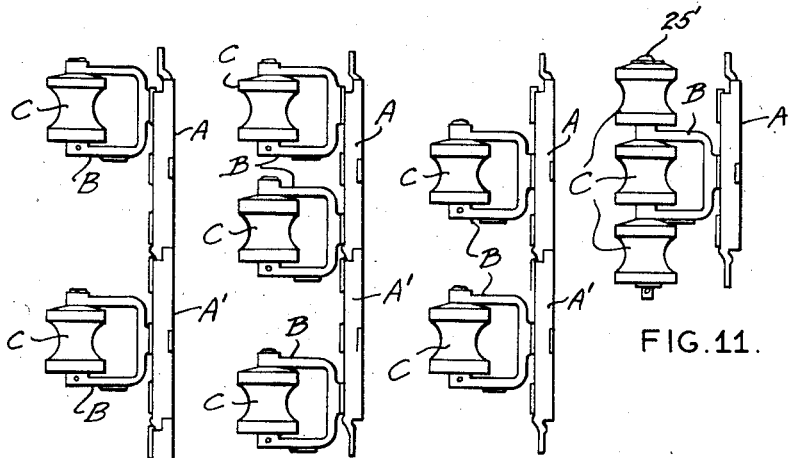

Figures 4, 5, and 6 are transverse sectional views on the lines 4—4, 5—5, and 6—6, respectively, Figure 3;

Figure 7 is a fragmental longitudinal sectional view of a pair of slightly modified rack-bases of our invention in end-to-end assembled or connected relation;

Figures 8, 9, 10, and 11 are reduced side elevational views of the rack of our invention illustrating the flexibility thereof for meeting different pole or line requirements; and Figure 12 is a reduced plan view of a rack of our invention with an insulator or spool disposed at 45° to the base.

Referring now more in detail and by reference characters to the drawings, which illustrate practical embodiments of our invention, the present rack includes and contemplates a single base A, as in Figures 1 and 12, or a plurality of companion bases A, A', of identical structure disposed in end-to-end relation for rack enlargement, as in Figures 2, 3, 7, 8, 9, 10, and 11.

In turn, each base A or A' is of oblong-rectangular channel formation and of suitable length, as best seen in Figure 1, each base being constructed preferably as a unitary casting from malleable iron or other suitable metallic material and comprising preferably integrally a pair of approximately parallel longitudinal or sidewalls 1 connected at their one or upper margin by a transverse top wall or web 2, the web 2 being formed longitudinally on its under face with spaced ribs 3 and the walls 1 being formed intermediate their ends and upon their lower margin with outwardly presented oppositely disposed apertured ears 4 for accommodating suitable fastening-members, not shown, for convenient attachment of the particular base to a pole or other supporting structure.

At its one or so-called upper end, as in Figure 1, the side-walls 1 of each base are longitudinally extended, as at 5, which latter are joined at their outer or free end by a cross or transverse wall 6. As best seen in Figure 3, the extensions 5 are of reduced height relatively to the walls 1. Hence a space or opening, as at 7, intermediate the wall 6 and the adjacent end of the web 2 is provided at one end of each base, and projecting outwardly from the upper margin of the end wall 6 longitudinally of the respective base and lengthwise disposed in a plane intermediate the upper and lower margins of the side walls 1 thereof, is a tongue 8, all for purposes presently appearing, the tongue 8 being reinforced by reduced side webs 9, 9, as best seen in Figure 3. Also for purposes presently appearing, each tongue 8 is centrally apertured, as at 10, and longitudinally or lengthwise channeled upon its upper face, as at 11.

At the opposite or lower end of each base, the top wall or web 2 is formed longitudinally with an obliquely downwardly presented extension 12, from the lower margin of which a second tongue 13 projects longitudinally of the base and in a plane to fit lengthwise into and through the opening 7 and snugly in flatwise impingement with the under face of the web 2 of an adjacent base, the tongue 13 being also centrally apertured, as at 14, and provided longitudinally on its upper face with ways or channels 15 for accommodating web-ribs 3, and the extension 12 being preferably reinforced by side webs 12'.

Longitudinally, the web 2 of each base A, A', is formed with a series of suitably spaced upstanding enclosures in the form of annular walls or bosses 16, each having an octagonal or other plural-sided inner face, as at 17, for purposes presently appearing, and the web 2 having a reduced aperture, as at 18, within the confines of each wall or boss 16 and being preferably for lightness also cut away, as at 19, intermediate the respective bosses 16.

Co-operable with each respective base, is a clevis-shaped bracket B preferably in the form of a U-shaped malleable casting integrally including a bight 20 and opposed parallel members or legs 21, 22, preferably annularly enlarged at their free outer ends in the provision of eyes 23, 23', having registering apertures 24 for accommodating a headed spindle or bolt 25.

Upon its outer face, the bracket-bight 20 is preferably integrally formed with a lug 26 having a correspondingly plural-sided lateral face, as shown, for co-operably seating in one or the other or a selected boss 16 of a base A or A'.

Similarly, one of the legs, as, for instance, the leg 22, is also provided with a lug 27 likewise provided with a side or lateral face of octagonal or other plural-sided geometric type for conformation with the wall of one or the other or a selected boss 16 of a base, the bight 20 and the leg 22 of each bracket B at its said lug having an aperture therethrough, as at 28, for accommodating a suitable screw-bolt or other securing member 29.

Sized for fitting snugly intermediate the opposed inner faces of the clevis eyes 23, 23', is a spool-shaped insulator C constructed preferably of porcelain or other suitable dielectric material and provided axially with a bore, as at 30, for accommodating a spindle or bolt 25, the bracket leg 22 at its eye 23 being formed with a way or opening, as at 31, and the bolt 25 having a registering way 32 for accommodating a cotter or other pin 33 for securing the bolt 25 and spool C detachably in position.

Thus a base A or A' and an insulator-equipped bracket B are co-operably uniquely formed for selective detachable engagement and at any selected angle, a bracket B either at its bight 20 or at its leg 22 being adapted for seating at its lug 26 or lug 27 in a selected boss 16 with the insulator C correspondingly disposed as may best meet the requirements of the particular line or installation either in parallel or right or oblique angular relation to the base, as shown in Figures 3 and 12, the bracket B in any such selected disposition being firmly and rigidly attached to the base by means of a fastening member 29 projected through the then registering apertures 28 and 18 for receiving a securing-nut 34, as best seen in Figure 3.

Further, in use and operation, the rack may comprise one or more of the bases A or A' in end-to-end relation, to meet the requirements of any particular line or installation. Thus Figures 11 and 12 illustrate single base racks, Figures 3, 9, and 10 show double or two base racks, and Figure 8 shows a three base rack. In any such plural base rack, the tongue 13 of one base, as, for instance, base A, Figure 2, is endwise projected through the end-opening 7 of the adjacent base A' and then flatwise snugly engages the under face of the web 2 of the base A' and the oblique extension 12 of base A hookwise fits over and securingly engages with the end wall 6 of base A'. At the same time, the tongue 8 of the base A' flatwise snugly engages the under face of the web of the base A, and when bases A, A', are so disposed in endwise hooked relation, the respective apertures 10 and 14 of the tongues 8 and 13 register with the opposite end-apertures 18 of the respective bases, as seen in Figure 3, any fastening-member 29 that may be projected through any such set of registering apertures further detachably securing said bases in longitudinally hooked end-to-end relation.

Thus any number of the bases A, A', may be readily and conveniently assembled and connected in end-to-end or longitudinal relation for enlarging the rack to meet the requirements of the particular installation, the engagement between the channeled tongues 8 and 13 with the web-ribs 3 augmenting the rigidity of the end-to-end assembly of the bases A, A'.

And, again, in any plural base rack, the insulators C may be selectively spaced, as indicated, for instance, in Figures 8, 9, and 10, and even in a single base rack, a plurality of insulators C may be mounted upon a single bracket B by employing a correspondingly elongated spindle or bolt 25', as illustrated in Figure 11.

If desired, each base A, A', may be provided on its under face and in co-operative relation to each boss 16 with a lug 35 tapped, as shown, for threaded engagement with a fastening member 29 in lieu of, and substitution for, a securing-nut 34, as shown in Figure 7.

The rack is exceedingly flexible for meeting line requirements and fulfills in every respect the objects stated, and it is to be understood that other changes and modifications in the form, construction, arrangement, and combination of the several parts of the rack may be made and substituted for those herein shown and described without departing from the nature and principle of our invention.

Having thus described our invetnion, what we claim and desire to secure by Letters Patent is:

1. A secondary rack including, in combination, a base having a web provided upon its upper face with an upstanding annular wall having a plural-sided inner face, a bracket, an insulator supported by the bracket, a projecting-lug on the bracket adapted to fit within the confines of, and having a plural-sided lateral face conforming to the inner face of, said wall for disposing the insulator at a selected angular relation to the base, and means engaging the lug and the web for securing the bracket in selected position to and upon the base.

2. A secondary rack including, in combination, a base having a plural-sided seat, a U-shaped bracket, an insulator supported by the bracket, and respective lugs projecting from the bight and from one of the legs of the bracket adapted interchangeably to fit within, and each having a plural-sided lateral face conforming to, the seat for selectively disposing the insulator axially in alignment with or at right angles to the web and also for disposing the bracket at a selected angular relation to the base.

3. A secondary rack including a first oblong rectangular base having a web and at an end an opening and a longitudinally extending tongue, said opening and tongue being offset out of the plane of the web, in combination with a second oblong rectangular base having a web and a longitudinally extending tongue, the latter being also offset from the plane of the second web and adapted to project through the opening of the first base and flatwise fit under the web thereof, the tongue of the first base then fitting flatwise under the web of the second base and the webs of said bases being in registering relation.

4. A secondary rack including a first oblong rectangular base having spaced side walls and a web joining said walls at their upper margin, said base having at an end a tongue extending longitudinally therefrom in a plane intermediate the upper and lower margins of said side walls and there being an opening intermediate said web and tongue, in combination with a second oblong rectangular base also having spaced side walls and a web joining the same at their upper margin, said second base having a tongue extending longitudinally therefrom in a plane intermediate the upper and lower margins of its side walls, the tongue of the second base being adapted for projection through the opening of the first base for flatwise engaging the under face of the web thereof and the tongue of the first base being adapted to then flatwise engage the under face of the web of the second base.

5. A secondary rack including a first oblong rectangular base having spaced side walls and a web joining said walls at their upper margin, said side walls having longitudinal extensions joined by a transverse end wall, a tongue projecting longitudinally of the base from said end wall and disposed in a plane intermediate the upper and lower margins of said side walls and there being an opening between said web and said end wall, in combination with a second oblong rectangular base having spaced side walls and a web joining the same at their upper margin, said second base having an extension projecting obliquely outwardly and downwardly from an end of the web thereof and a tongue projecting longitudinally of the second base from the lower margin of said oblique extension and disposed in a plane intermediate the upper and lower margins of the side walls of the second base, the tongue of the second base being adapted for projection through the opening of the first base for flatwise engaging the under face of the web thereof, said oblique extension then hookwise engaging said end wall and the tongue of the first base then engaging flatwise with the under face of the web of the second base.

6. A secondary rack including a first oblong rectangular base having spaced side walls and a web joining said walls at their upper margin, said side walls having longitudinal extensions joined by a transverse end wall, a tongue projecting longitudinally of the base from said end wall and disposed in a plane intermediate the upper and lower margins of said side walls and there being an opening between said web and said end wall, in combination with a second oblong rectangular base having spaced side walls and a web joining the same at their upper margin, said second base having an extension projecting obliquely outwardly and downwardly from an end of the web thereof and a tongue projecting longitudinally of the second base from the lower margin of said oblique extension and disposed in a plane intermediate the upppr and lower margins of the side walls of the second base, the tongue of the second base being adapted for projection through the opening of the first base for flatwise engaging the under face of the web thereof, said oblique extension then hookwise engaging said end wall and the tongue of the first base then engaging flatwise with the under face of the web of the second base, and said tongues and webs having channels and ribs for inter-engagement when said tongues are in engagement with said webs.

7. A secondary rack including a first oblong rectangular base having spaced side walls and a web joining said walls at their upper margin, said side walls having longitudinal extensions joined by a transverse end wall, a tongue projecting longitudinally of the base from said end wall and disposed in a plane intermediate the upper and lower margins of said side walls and there being an opening between said web and said end wall, in combination with a second oblong rectangular base having spaced side walls and a web joining the same at their upper margin, said second base having an extension projecting obliquely outwardly and downwardly from an end of the web thereof and a tongue projecting longitudinally of the second base from the lower margin of said oblique extension and disposed in a plane intermediate the upper and lower margins of the side walls of the second base, the tongue of the second base being adapted for projection through the opening of the first base for flatwise engaging the under face of the web thereof, said oblique extension then hookwise engaging said end wall and the tongue of the first base then engaging flatwise with the under face of the web of the second base, said tongues and webs having bolt-openings in registration when the tongues and webs are in said engaging relation.

8. A secondary rack for insulators including a base having spaced side walls, a web joining said walls at their upper margin, and means comprising a tongue projecting longitudinally from and at one end of the base and an opening in the opposite end of the base for enabling end-to-end engagement with companion bases, said tongue and opening being offset out of the plane of the web and the web being adapted to seat an insulator-bracket upon its upper face.

9. A secondary rack for insulators including a base having spaced side walls, a web joining said walls at their upper margin, and means comprising a tongue projecting longitudinally from and at one end of the base and an opening in the opposite end of the base for enabling end-to-end engagement with companion bases, said tongue and opening being offset out of the plane of the web and the web being provided upon its upper face with a longitudinal series of spaced seats for insulator brackets.

10. A secondary rack including, in combination, a base having a web provided upon its upper face with an upstanding annular wall having a plural-sided inner face, a bracket, an insulator supported by the bracket, a projecting lug on the bracket adapted to fit within the confines of, and having a plural-sided lateral face conforming to the inner face of, said wall for disposing the insulator at a selected angular relation to the base, and means including a bolt engaging the lug and web for securing the bracket in selected position to and upon the base.

11. A secondary rack including, in combination, a base having a web provided with an enclosure about its upper face, a bracket, an insulator supported by the bracket, a projecting lug on the bracket having a contour conformable with said enclosure for fitting therein for disposing the insulator at a selected angular relation to the base, and means engaging the lug and the web for securing the bracket in selected position to and upon the base, said means comprising a tapped boss integral with and disposed upon the under face of the base-web, and a bolt projecting through the bracket and base-web and threaded into said boss.

GEORGE McD. JOHNS.
THOMAS T. RICHARDS.